(12) United States Patent
Yang et al.

(10) Patent No.: US 8,743,515 B2
(45) Date of Patent: Jun. 3, 2014

(54) ESD CLAMP WITH NOVEL RC TRIGGERED CIRCUIT

(75) Inventors: Tzu-Yi Yang, Taipei (TW); Kuo-Ji Chen, Taipei County (TW)

(73) Assignee: Taiwan Semiconductor Manufacturing Co., Ltd., Hsin-Chu (TW)

( * ) Notice: Subject to any disclaimer, the term of this patent is extended or adjusted under 35 U.S.C. 154(b) by 194 days.

(21) Appl. No.: 13/349,962

(22) Filed: Jan. 13, 2012

(65) Prior Publication Data

US 2013/0182356 A1 Jul. 18, 2013

(51) Int. Cl.
*H02H 9/04* (2006.01)

(52) U.S. Cl.
USPC .......................................................... 361/56

(58) Field of Classification Search
USPC .......................................................... 361/56
See application file for complete search history.

(56) References Cited

U.S. PATENT DOCUMENTS

| 6,310,379 | B1 | 10/2001 | Andresen et al. | |
|---|---|---|---|---|
| 7,221,551 | B2 | 5/2007 | Chen | |
| 2003/0048590 | A1* | 3/2003 | Hwang | 361/111 |
| 2009/0128992 | A1* | 5/2009 | Haralabidis et al. | 361/329 |
| 2013/0050885 | A1* | 2/2013 | Chen et al. | 361/56 |

OTHER PUBLICATIONS

Melikyan, Vazgen, et al. "5V Tolerant Power clamps for Mixed-Voltage IC's in 65nm 2.5V Salicided CMOS Technology." 4 Pages, Sep. 2010.
Ker, Ming-Dou, et al. "ESD Protection Design With On-Chip ESD Bus and High-Voltage-Tolerant ESD Clamp Circuit for Mixed-Voltage I/O Buffers." IEEE Transactions on Electron Devices, vol. 55, No. 6, Jun. 2008. 8 Pages.
Wang, Guang-Cheng, et al. "Gate-Driven 3.3V ESD Clamp Using 1.8V Transistors." 3 Pages, May 2011.
U.S. Appl. No. 13/217,533, filed Aug. 25, 2011.

* cited by examiner

*Primary Examiner* — Jared Fureman
*Assistant Examiner* — Kevin J Comber
(74) *Attorney, Agent, or Firm* — Eschweiler & Associates, LLC (57) ABSTRACT

Some embodiments relate to an area efficient electrostatic discharge (ESD) clamp comprising an RC trigger circuit, having one or more low-voltage, thin-oxide devices, which is configured to operate with a high-voltage power supply. In some embodiments, the ESD clamp comprises an RC trigger circuit connected between a first circuit node having a first voltage and a second circuit node having a second voltage. The RC trigger circuit comprises a resistive element connected in series with a thin-oxide MOS capacitor. The MOS capacitor has a source and drain connected to an intermediate supply voltage between the first and second voltage, and a body connected to the second voltage. By connecting the source and drain to the intermediate supply voltage, the thin-oxide MOS capacitor is able to reliably operate with a high-voltage power supply.

20 Claims, 4 Drawing Sheets

ESD CLAMP WITH NOVEL RC TRIGGERED CIRCUIT

BACKGROUND

An electrostatic discharge (ESD) event is a sudden and unexpected voltage and/or current discharge that transfers energy to an electronic device from an outside body (e.g., a human body, which can be approximated in modeling by a human body model ESD events can damage electronic devices, for example by "blowing out" a gate oxide of a transistor in cases of high voltage or by "melting" an active region area of a device in cases of high current, causing junction failure. If devices are damaged by an ESD event, the electronic product can be rendered less operable than desired, or can even be rendered inoperable altogether.

Figure 1:
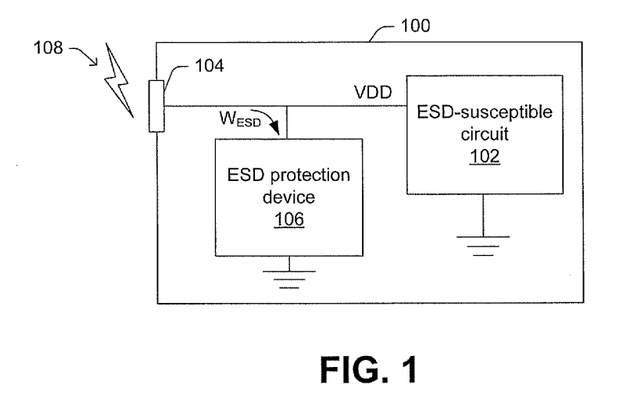
FIG. 1 shows an integrated circuit that makes use of a conventional ESD protection device.

To protect electronic devices from ESD events, engineers have developed ESD protection devices. FIG. 1 shows an example of an integrated circuit 100 that includes an ESD-susceptible circuit 102, having one or more semiconductor devices, which is electrically connected to an exterior circuit assembly (not shown) via an external IC pin 104. The external IC pin 104 can be a supply pin that supplies a DC supply voltage (e.g., VDD or VSS) to the circuit 102, or can be an input/output (I/O) pin that transfers input or output signals there from, for example. A conventional ESD protection device 106 is electrically connected between the circuit 102 and the external IC pin 104 to mitigate damage due to an ESD event 108. If an ESD event 108 occurs, the ESD protection device 106 detects the ESD event 108 and shunts the energy associated with it away from the circuit 102 (e.g., as shown by arrow $W_{ESD}$), thereby preventing damage to the circuit 102. In the absence of an ESD event 108, the ESD protection device 106 is off and thus leaves signals between circuit 102 and pin 104 unchanged.

DETAILED DESCRIPTION

One or more implementations of the present disclosure will now be described with reference to the attached drawings, wherein like reference numerals are used to refer to like elements throughout. The drawings are not necessarily drawn to scale.

Modern integrated chips often utilize a multiple oxide processing technology, wherein different semiconductor devices having different oxide thicknesses are offered within an integrated chip design. The different semiconductor devices are configured to reliably operate at different voltages. For example, many dual oxide processing technologies comprise low-voltage 1.8-V standard Vt FETs and high voltage 3.3-V FETs. The low-voltage 1.8-V standard Vt FETs have a thinner gate oxide (e.g., approximately 35 Å) than the high voltage 3.3-V FETs (e.g., approximately 68 Å).

In some instances, designers may want to use low-voltage devices for a first on-chip circuit (e.g., having 1.8-V devices), while using high-voltage devices for a second on-chip circuit (e.g., having 3.3-V devices). If an ESD protection device made up of low-voltage devices (e.g., 1.8-V devices) were to be used as an interface to the second on-chip circuit, the low-voltage devices would potentially be unable to reliably withstand high-voltage signals (e.g., 3.3V).

Accordingly, the present disclosure relates to an area efficient ESD clamp comprising an RC trigger circuit, having one or more low-voltage, thin-oxide devices, which is configured to operate with a high-voltage power supply. In some embodiments, the ESD clamp comprises an RC trigger circuit connected between a first circuit node having a first voltage and a second circuit node having a second voltage. The RC trigger circuit comprises a resistive element connected in series with a thin-oxide MOS capacitor. The MOS capacitor has a source and drain connected to an intermediate supply voltage between the first and second voltage, and a body connected to the second voltage. By connecting the source and drain to the intermediate supply voltage, the thin-oxide MOS capacitor is able to reliably operate with a high-voltage power supply.

Figure 2:
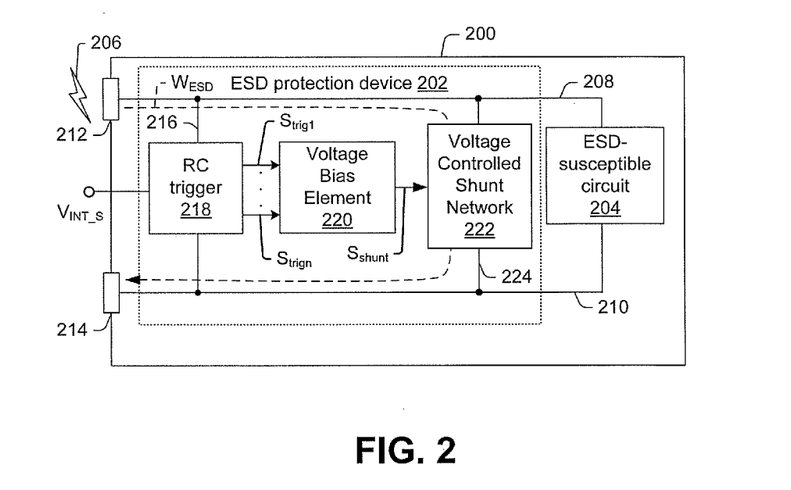
FIG. 2 shows a block diagram of some embodiments of an integrated circuit having an RC trigger circuit with one or more thin-oxide devices connected to an intermediate supply voltage.

FIG. 2 shows some embodiments of an integrated circuit 200 that includes an ESD susceptible circuit 204 having one or more semiconductor devices configured to operate at a first voltage (e.g., 3.3V). An ESD protection device 202, which acts as an interface between ESD susceptible circuit 204 and external pins (212, 214), is arranged to protect the ESD susceptible circuit 204 from an ESD event 206. To avoid or limit the use of different gate oxide thicknesses on the integrated circuit 200 the ESD protection device 202 comprises one or more thin-oxide, low-voltage (e.g., transistor and/or MOS capacitors having a 1.8-V oxide thickness) devices, which cannot typically operate at the first voltage (e.g., 3.3 V). However, the thin-oxide, low-voltage devices of the ESD protection device 202 have terminals (e.g., gate, drain, and/or source) connected to an intermediate supply voltage $V_{INT\_S}$ in a way that allows the ESD protection device 202 to use devices having a thin oxide thickness, even though the ESD protection device 202 sees high operating voltages. This streamlines manufacturing and provides uniformly fast response times to ESD events when thin gate oxides are used.

Referring again to FIG. 2, the ESD susceptible circuit 204 can be electrically connected to first and second circuit nodes 208, 210, which can be associated with first and second external IC pins 212, 214, respectively. The first circuit node 208 is held at the first voltage (e.g., Vdd) and the second circuit node 210 is held at a second voltage (e.g., GND). It will be appreciated that although FIG. 2 shows the first and second circuit nodes 208, 210 electrically connected to external IC pins 212, 214, in other embodiments the first and second circuit nodes 208, 210 can be located on internal nodes within the integrated circuit 200.

The ESD protection device 202 includes a first electrical path 216 extending between the first and second circuit nodes 208, 210. The first electrical path 216 includes an RC trigger circuit 218 configured to generate one or more trigger signals $S_{trig1}, \ldots, S_{trign}$ depending on whether an ESD event 206 is present. In some embodiments, the one or more trigger signals $S_{trig1}, \ldots, S_{trign}$ have an intermediate supply voltage at which low-voltage, thin-oxide devices can reliably operate. The one or more trigger signals $S_{trig1}, \ldots, S_{trign}$ are provided to a voltage bias element 220 having inputs configured to receive the one or more trigger signals output from RC trigger circuit 218. The voltage bias element 220 can output a shunt control signal $S_{shunt}$ based on the one or more trigger signals.

In some embodiments, the RC trigger circuit 218 comprises a first order RC trigger circuit (i.e., an RC circuit having one resistor and one capacitor). The first order RC trigger circuit comprises a resistive element and a low-voltage, thin-oxide capacitor. The first order RC trigger circuit has a first terminal connected to the first circuit node 208 and a second terminal connected to the second circuit node 210. The low-voltage, thin-oxide capacitor has one or more terminals (e.g., gate, source, and/or drain) connected to an intermediate supply voltage node $V_{INT\_S}$, held at an intermediate supply voltage having a value between the first and the second voltages. In some embodiments, the intermediate supply voltage can be approximately mid-way between the first and second voltages (e.g., 1.8 V). As will be more fully appreciated below, by connecting the low-voltage, thin-oxide capacitor to the intermediate supply voltage, the low-voltage, thin-oxide is able to reliably withstand a higher operating voltage. For example, in some embodiments a thin-oxide MOS capacitor having a 1.8-V oxide is able to operate at a 3.3 V gate voltage.

A voltage controlled shunt network 222 is electrically connected to a second electrical path 224, which extends between the first and second circuit nodes 208, 210 and is in parallel with the first electrical path 216. The voltage controlled shunt network 222 has an input electrically connected to the output of the voltage bias element 220. The voltage-controlled shunt network 222 is adapted to selectively shunt energy from the ESD event 206 over the second electrical path 224 based on the shunt control signal $S_{shunt}$.

Figure 3:
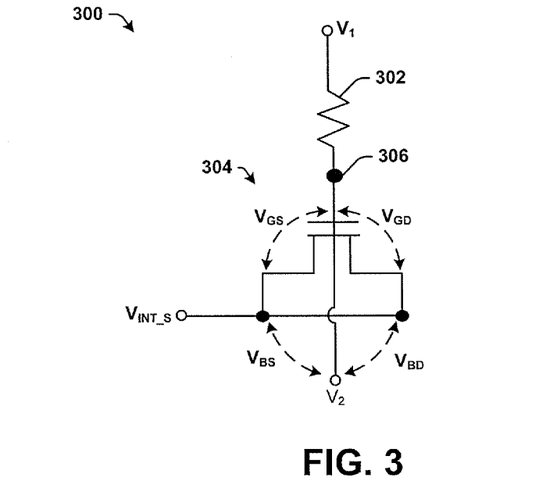
FIG. 3 shows a circuit schematic of an RC trigger circuit in accordance with some embodiments.

FIG. 3 illustrates some embodiments of a first order RC trigger circuit 300 as provided herein. The first order RC trigger circuit 300 comprises a resistive element 302 connected in series with a thin-oxide MOS capacitor 304. The resistive element 302 has a first terminal connected to a first voltage $V_1$ (e.g., 3.3 V) and a second terminal connected to an intermediary node 306 having a first intermediate voltage (due to the voltage drop over resistive element 302). The resistive element 302 can be implemented as a polysilicon structure, for example. The thin-oxide MOS capacitor 304 can be implemented as a MOS-capacitor with a thin oxide (e.g., a 1.8V oxide thickness). In some embodiments, the thin-oxide MOS capacitor 304 comprises a low-voltage NMOS device having a gate connected to intermediary node 306, a source and drain connected to an intermediate supply voltage node $V_{INT\_S}$, and a body connected to a second voltage $V_2$. In some embodiments, the intermediate supply voltage is established by an on-chip voltage regulator, although it could also be established by a voltage divider or other similar circuits. In other embodiments, the intermediate supply voltage is established by an external IC pin.

By connecting the source and drain of the thin-oxide MOS capacitor 304 to the intermediate supply voltage node $V_{INT\_S}$, the thin-oxide MOS capacitor 304 is able to reliably operate at the first intermediate voltage. For example, in some embodiments the first voltage $V_1$ is equal to approximately 3.3 V, the second voltage $V_2$ is equal to approximately 0 V. In such an embodiment, the thin-oxide MOS capacitor 304 can be formed to have an oxide thickness corresponding to a 1.8-V device, but which is still able to reliably operate at a gate voltage of greater than 1.8 V. This is because by connecting the source and drain of the thin-oxide MOS capacitor 304 to the intermediate supply voltage of 1.8 V, the $V_{GS}/V_{GS}/V_{GD}/V_{BS}$ maximum values are held below 1.8 V (e.g., if first intermediate voltage is equal to 2.5 V, $V_{GS}$=2.5 V-1.8 V=0.7 V, $V_{GS}$=1.8 V-0 V=1.8 V, etc.). Furthermore, because the body of thin-oxide MOS capacitor 304 is connected to approximately 0 V, the RC trigger circuit 300 can generate a trigger signal $S_{trig1}$ having a low value (e.g., a logical "0").

In some embodiments, the disclosed RC trigger circuit is configured to generate a plurality of trigger signals, wherein one or more trigger signals are at the intermediate supply voltage. By generating one or more trigger signals at the intermediate supply voltage, which low-voltage devices can reliably withstand, the disclosed RC trigger circuit helps facilitate the use of low-power devices within a downstream voltage bias element.

Figure 4:
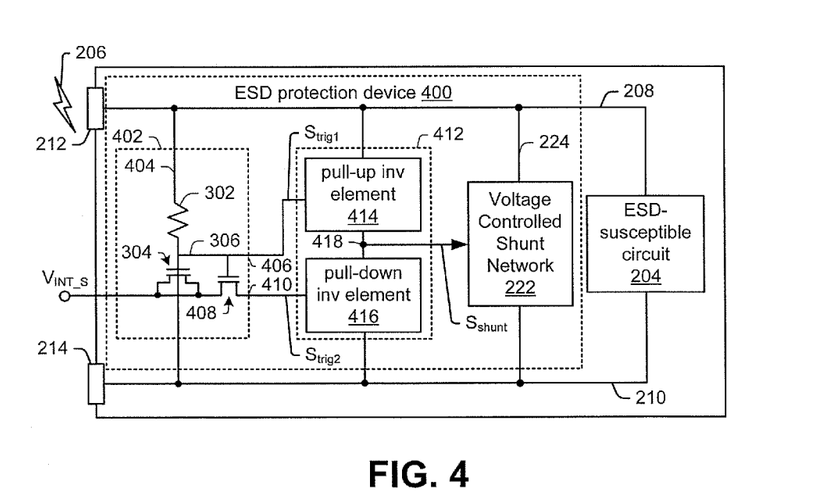
FIG. 4 shows a circuit schematic of some embodiments of an integrated circuit having an ESD protection device comprising a disclosed RC trigger circuit.

For example, FIG. 4 shows a circuit schematic of some embodiments of an ESD protection device 400 having a first order RC trigger circuit 402 configured to generate a trigger signal at the intermediate supply voltage. The first order RC trigger circuit 402 comprises an intermediary node 306 electrically connected to resistive element 302. The intermediary node 306 is also connected to a first output terminal 406 of the first order RC trigger circuit 402 and to the gate of a low-voltage NMOS transistor 408 (i.e., an NMOS transistor having a thin oxide thickness). The first output terminal 406 outputs a first trigger signal $S_{trig1}$. The low-voltage NMOS transistor 408 has a source terminal connected to the intermediate supply voltage node $V_{INT\_S}$, and a drain connected to a second output terminal 410 of the first order RC trigger circuit 402, which outputs a second trigger signal $S_{trig2}$.

In some embodiments, the first and second trigger signals, $S_{trig1}$ and $S_{trig2}$, are respectively provided to a first, pull-up inverter element 414 and a second, pull-down inverter element 416 of the voltage bias element 412. If an ESD event 206 is detected, thin-oxide MOS capacitor 304 acts as a short, providing the second voltage to intermediary node 306. The second voltage is output at output terminal 406 as the first trigger signal $S_{trig1}$. The first trigger signal $S_{trig1}$ operates the first, pull-up inverter element 414 to connect node 418 to the first circuit node 208, thereby activating the shunt signal $S_{shunt}$ (e.g., setting $S_{shunt}$ to a logical "1") and causing the voltage controlled shunt network 222 to discharge energy of the ESD event 206 over the second electrical path 224. After the ESD event passes, the first order RC trigger circuit 402 de-activates the first trigger signal $S_{trig1}$ and re-activates the second trigger signal $S_{trig2}$.

In the absence of an ESD event, resistive element 302 is configured to generate a first intermediate voltage, which is less than the first voltage, at intermediary node 306. The low-voltage NMOS transistor 408 is configured to receive the first intermediate voltage. The first intermediate voltage turns on low-voltage NMOS transistor 408 and causes it to output the intermediate supply voltage at the second output terminal 410 as the second trigger signal $S_{trig2}$. The second trigger signal $S_{trig2}$ operates the second, pull-down inverter element 416 to connect node 418 to the second circuit node 210, thereby de-activating the shunt signal $S_{shunt}$ (e.g., setting $S_{shunt}$ to a logical "0"). By generating the second trigger signal $S_{trig2}$ at the intermediate supply voltage, which low-voltage devices can reliably withstand, the disclosed RC trigger circuit helps facilitate the use of low-power devices within a downstream voltage bias element.

It will be appreciated that the trigger signals output from first order RC trigger circuit 402 may vary in alternative embodiments. For example, in some alternative embodiments, the first and second trigger signals, $S_{trig1}$ and $S_{trig2}$, may be both connected to the intermediary supply voltage provided from the drain of low-voltage NMOS transistor 408. In such an embodiment, both the pull-up inverter element 414 and the pull-down inverter element 416 may comprise low-voltage, thin-oxide transistor devices.

Figure 5:
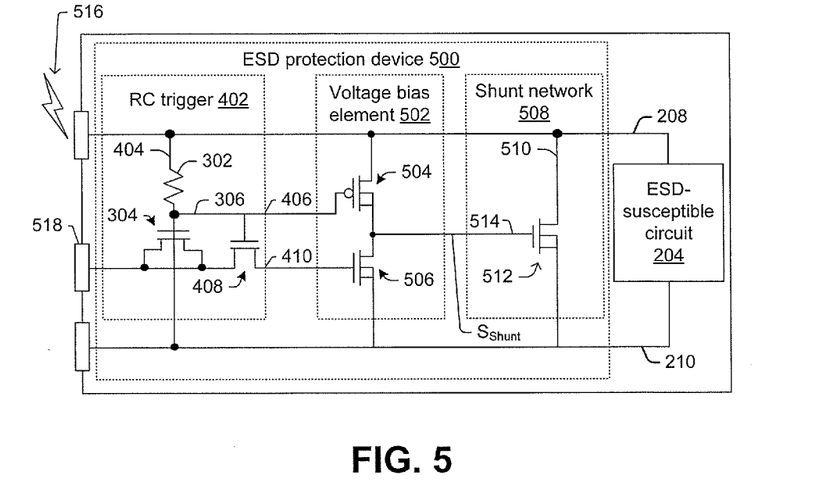
FIG. 5 shows a circuit schematic of an ESD protection device in accordance with some embodiments.
Figure 6:
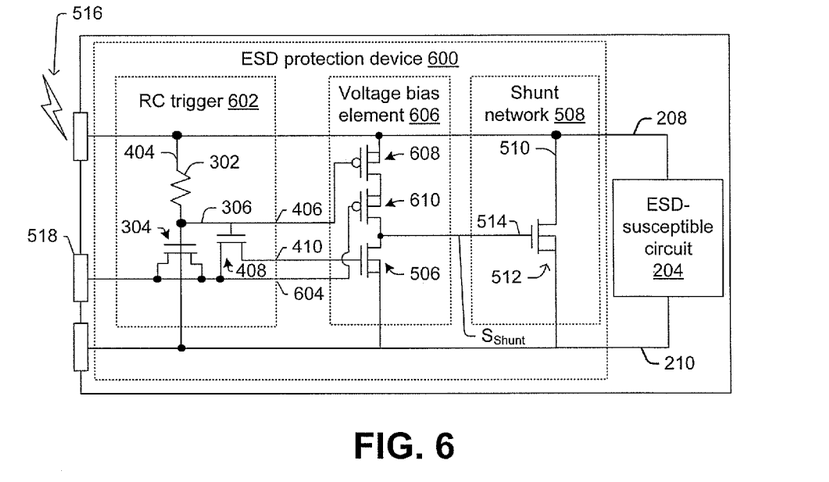
FIG. 6 shows a circuit schematic of an ESD protection device in accordance with some embodiments.

It will be appreciated that the components of FIGS. 2 and 4 may take one of several different forms depending on the particular implementation. To help elucidate some of these forms, FIGS. 5-6 are described below as comprising a 3.3 V supply voltage, 1.8-V low-voltage devices, and 3.3-V high-voltage devices. It will be appreciated that these examples do not limit the scope of the present disclosure, but rather illustrate merely a few examples of how the concepts disclosed herein may be realized.

FIG. 5 shows some embodiments of an ESD protection device 500 having a disclosed first order RC trigger circuit 402. In this embodiment, the first order RC trigger circuit 402 is located along a first electrical path 404 and has a resistive element 302 connected in series with thin-oxide MOS capacitor 304. In some embodiments, the thin-oxide MOS capacitor 304 comprises a source and drain connected to an external IC pin 518 configured to provide an intermediate supply voltage having a value between the voltage of the first circuit node 208 (e.g., $V_{DD}$) and the voltage of the second circuit node 210 (e.g., $V_{SS}$). Intermediary node 306 is connected to a first output terminal 406 of the first order RC trigger circuit 402 and to the gate of a low-voltage NMOS transistor 408. The low-voltage NMOS transistor 408 has a source terminal connected to the intermediate supply voltage established by external IC pin 518, and a drain connected to a second output terminal 410 of the RC trigger circuit 402.

A voltage bias element 502, implemented as an inverting element, has inputs electrically connected to output terminals 406 and 410 of the first order RC trigger circuit 402. In some embodiments, the inverter comprises a high-voltage PMOS transistor device 504 connected in series with a low-voltage NMOS transistor device 506. The high-voltage PMOS transistor device 504 may comprise a drain-extended PMOS transistor device 504 in some embodiments. The low-voltage NMOS transistor device 506 may comprise a NMOS transistor device having a thin gate oxide.

The high-voltage PMOS transistor device 504 has a gate connected to output terminal 406 and a source connected to the first circuit node 208. The low-voltage NMOS transistor device 506 has drain connected to the drain of the high-voltage PMOS transistor device 504, a source connected to the second circuit node 210, and a gate connected to the drain of the low-voltage NMOS transistor 408 (i.e., output terminal 410). In alternative embodiments, the inverting element can also include additional inverters (e.g., each inverting element can be made up of three inverters chained one after another, rather than just a single inverter as illustrated).

A voltage controlled shunt network 508 includes a high-voltage shunt transistor 512 (e.g., NMOS transistors), which is arranged on a second electrical path 510. Node 514 electrically connects the gate of the high-voltage shunt transistor 512 to the voltage bias element 502. Because the shunt transistor 512 can be the only component on the second electrical path 510, the shunt transistor 512 can have structural features that help it to withstand relatively high voltage biases (e.g., a 3.3 V gate to drain ($V_{SD}$) or drain to source ($V_{DS}$) bias).

For example, in some embodiments, the high-voltage shunt transistor 512 comprises a high-voltage MOS transistor device (HVMOS). The HVMOS transistor device is an asymmetric device with drain sustaining higher voltage (>3.3 V) while its gate oxide is still the same (e.g., 1.8-V oxide). The HVMOS device comprises a longer drain region than the other transistors in the ESD protection device 500, wherein the longer drain region helps safely dissipate a higher voltage. The drain of the high-voltage shunt transistor 512 could also have an overall lower dosing profile (e.g., n+ instead of n++), relative to the drains of the other transistors in the ESD protection device 500, which provides a slightly lower conductivity and again can help dissipate a higher voltage.

In the absence of an EDS event, thin-oxide MOS capacitor 304 acts as an open, setting intermediary node 306 to a relatively high voltage (e.g., approximately 3 V). The relatively high voltage is provided to the gate of the high-voltage PMOS transistor device 504 and the gate of the low-voltage NMOS transistor 408. The high-voltage PMOS transistor device 504 turns off. The low-voltage NMOS transistor 408 turns on, causing the intermediate supply voltage (e.g., 1.8 V) to flow through the low-voltage NMOS transistor 408. Since the source and drain of the low-voltage NMOS transistor 408 are at the intermediate supply voltage (e.g., 1.8 V), the application of the relatively high voltage (e.g., approximately 3 V) to the gate of the thin-oxide, low-voltage NMOS transistor 408 does not damage the thin-oxide. The intermediate supply voltage (e.g., 1.8 V) output from the drain is provided to the gate of low-voltage NMOS transistor device 506, resulting in the voltage bias element 502 driving shunt control signals $S_{shunt}$ to a relatively low voltage (e.g., representing logical "0" states) and thereby turning off the shunt transistor 512 and causing energy to flow to the ESD susceptible circuit 204.

When an impingent ESD event 516 is present, the thin-oxide MOS capacitor 304 acts as an electrical short, thus setting intermediary node 306 to the second voltage (e.g., 0 V) just after the onset of the ESD event 516. A relatively low-voltage pulse is provided to the gate of the high-voltage PMOS transistor device 504 and the gate of the low-voltage NMOS transistor 408. The high-voltage PMOS transistor device 504 turns on causing the first voltage (e.g., 3.3 V) to flow through the high-voltage PMOS transistor device 504 to node 514. The low-voltage NMOS transistor 408 turns off, thereby turning off low-voltage NMOS transistor device 506. This results in the voltage bias element 502 pulsing the shunt control signal $S_{shunt}$ to a relatively high voltage (e.g., representing logical "1" states) that turns on the shunt transistor 512. The energy of the ESD event 516 now flows over the second electrical path 510 (which now has a low resistance because transistor 512 is on) such that the energy of the ESD event 516 is diverted away from the ESD-susceptible circuit 204.

FIG. 6 shows an ESD protection device 600 that includes another embodiment of an RC trigger circuit 602 and a voltage bias element 606. The RC trigger circuit 602 is configured to output an additional trigger signal at a third output node 604. The additional trigger signal is connected to the intermediate supply voltage.

The voltage bias element 606 comprises an inverter having a pull-up element comprising a low-voltage PMOS cascode. The low-voltage PMOS cascode comprises a first low-voltage PMOS transistor 608 (e.g., a 1.8-V device) and a second low-voltage PMOS transistor 610 (e.g., a 1.8-V device). The first low-voltage PMOS transistor 608 comprises a source connected to the first circuit node 208 and a gate connected to the first output terminal 406. The second low-voltage PMOS transistor 610 has a gate connected to the third output node 604 (i.e., the intermediate supply voltage), a source connected to the drain of the first low-voltage PMOS transistor 608, and a body connected to the source.

When an ESD event occurs, the thin-oxide MOS capacitor 304 acts as a short and node 306 is set approximately equal to the second voltage (e.g., 0 V). The first low-voltage PMOS transistor 608 is turned on. The second low-voltage PMOS transistor 610 is also turned on since the body is connected to the drain of the first low-voltage PMOS transistor (e.g., at 3.3 V). Therefore, the low-voltage PMOS cascode is turned on, driving node 514 to a first voltage and turning on shunt transistor 512 to discharge the ESD event 516.

When an ESD event is not present, the thin-oxide MOS capacitor 304 acts as an open and node 306 is set approximately equal to a relatively high voltage (e.g., approximately 3 V). The first low-voltage PMOS transistor 608 is turned off. The second low-voltage PMOS transistor 610 is also turned off since the body is connected to the drain of the first low-voltage PMOS device which is at approximately 0 V.

It will be appreciated that the embodiments illustrated and described above are but a few examples contemplated as falling within the scope of the present disclosure. For example, although the transistors in FIGS. 3-5 have been shown as MOS-type devices, other types of transistors (e.g., bipolar junction transistors (BJTs)) could also be used. In addition, although the illustrated circuit examples show p-type devices and n-type devices, it will be appreciated that the polarities of these devices can be switched in other embodiments along with a corresponding change in applied biases. Other combinations are also contemplated as falling within the scope of this disclosure. Furthermore, it will be appreciated that although the disclosed ESD protection circuit is described herein in relation to 1.8-V low-voltage devices and 3.3V high-voltage devices that the ESD protection circuit is not limited to these specific voltage values. Rather, the disclosed ESD protection circuit may be formed utilizing any devices having an oxide thickness that is less than that which can reliable withstand the supply voltage.

Figure 7:
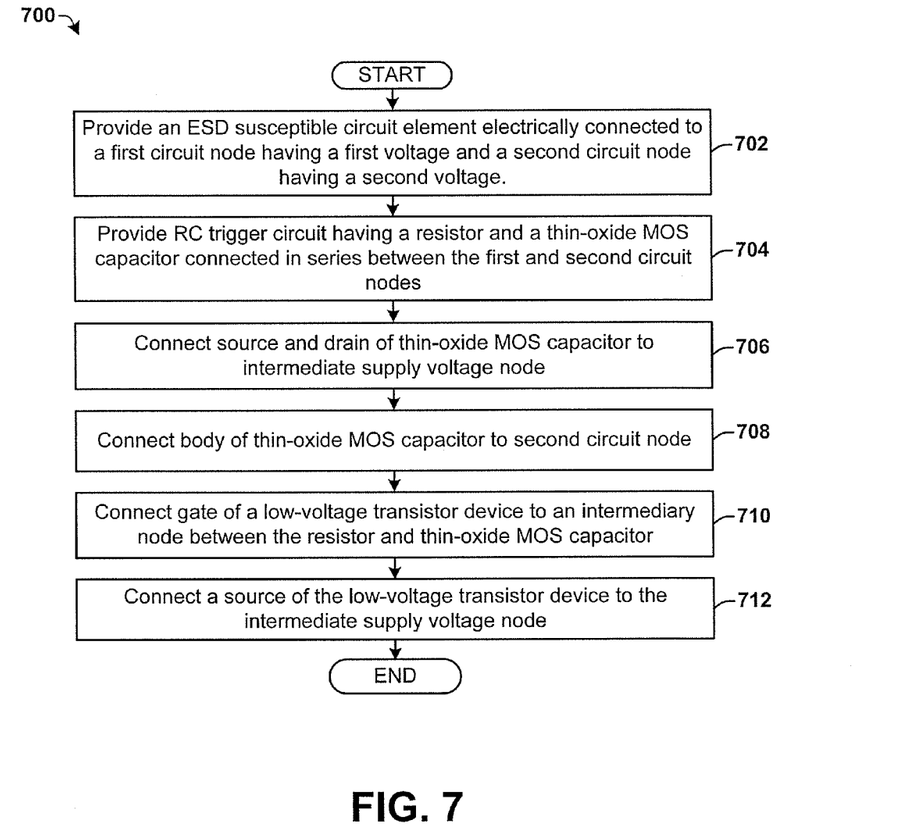
FIG. 7 shows a flow diagram of some embodiments of a method of forming an ESD protection device comprising low-voltage devices, which are configured to operate at a high-voltage supply voltage.

FIG. 7 illustrates a flow diagram of some embodiments of a method 700 of forming an ESD protection device comprising low-voltage devices, which are configured to operate at a high supply voltage. While method provided herein (e.g., method 700) is illustrated and described below as a series of acts or events, it will be appreciated that the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects or embodiments of the description herein. Further, one or more of the acts depicted herein may be carried out in one or more separate acts and/or phases.

At step 702 an ESD susceptible circuit element electrically connected to a first circuit node having a first voltage and a second circuit node having a second voltage is provided.

At step 704 an RC trigger circuit is provided having a resistive element and a thin-oxide MOS capacitor connected in series between the first and second circuit nodes. In some embodiments, the RC trigger circuit comprises a first order RC trigger circuit having one resistor and one capacitor. The RC trigger circuit may be configured to act as an interface between the ESD susceptible circuit and external integrated chip pins, in some embodiments.

At step 706 the source and drain of thin-oxide MOS capacitor are connected to intermediate supply voltage node. The intermediate supply voltage node is configured to provide an intermediate supply voltage, having a voltage between the first and second voltage, to the source and drain. By connecting the source and drain of the MOS capacitor to the intermediate supply voltage, the thin-oxide MOS capacitor is able to reliable operate at the first voltage, which is greater than the threshold voltage of the MOS capacitor.

At step 708 the body of the thin-oxide MOS capacitor is connected to the second circuit node having the second voltage.

At step 710 a gate of a low-voltage transistor device is connected to an intermediary node between the resistive element and thin-oxide MOS capacitor. The low-voltage transistor device is formed to have a thin gate oxide (e.g., a 1.8-V oxide).

At step 712 a source of the low-voltage transistor device is connected to the intermediate supply voltage node. By connecting the source of the low-voltage transistor to the intermediate supply voltage node, the low-voltage transistor can output a trigger signal from the RC trigger circuit having an intermediate supply voltage value, to downstream ESD protection elements.

It will be appreciated that identifiers such as "first" and "second" do not imply any type of ordering or placement with respect to other elements; but rather "first" and "second" and other similar identifiers are just generic identifiers. In addition, it will be appreciated that the term "electrically connected" includes direct and indirect connections. For example, if element "a" is electrically connected to element "b", element "a" can be electrically connected directly to element "b" and/or element "a" can be electrically connected to element "b" through element "c", so long as there is an operable electrical connection between elements "a" and "b".

While the disclosure has been illustrated and described with respect to one or more implementations, alterations and/or modifications may be made to the illustrated examples without departing from the spirit and scope of the appended claims. In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "including", "includes", "having", "has", "with", or variants thereof are used in either the detailed description and the claims, such terms are intended to be inclusive in a manner similar to the term "comprising".

Therefore, the present disclosure relates to an area efficient electrostatic discharge (ESD) clamp comprising an RC trigger circuit, having one or more low-voltage, thin-oxide devices, which is configured to operate with a high-voltage power supply In some embodiments, the present disclosure relates to an integrated chip, comprising an electrostatic discharge (ESD) susceptible circuit electrically connected to a first circuit node having a first voltage and a second circuit node having a second voltage. An ESD protection device, configured to act as an interface between the ESD susceptible circuit and external integrated chip pins, comprises a first electrical path extending between the first and second circuit nodes. The first electrical path includes an RC trigger circuit configured to selectively assert one or more trigger signals. The RC trigger circuit comprises a resistive element connected between the first circuit node and an intermediary node, and a MOS capacitor having a gate connected to the intermediary node, a source and drain connected to an intermediate supply voltage node having an intermediate supply voltage between the first and second voltages, and a body connected to the second circuit node.

In another embodiment, the present disclosure relates to an electrostatic discharge (ESD) protection device to protect a circuit, which is electrically connected to first and second circuit nodes, from an ESD event. The ESD protection device comprises a first electrical path having a first order RC trigger circuit comprising a resistive element and a thin-oxide MOS capacitor connected in series between the first and second circuit nodes. The thin-oxide MOS capacitor has a gate connected to the resistive element, a source and drain connected to an intermediate supply voltage node, and a body connected to the second circuit node. A voltage bias element comprising an inverter having one or more low-voltage transistors is configured to receive one or more trigger signals having the intermediate supply voltage from the first order RC trigger circuit. A second electrical path extends between the first and second circuit nodes and is in parallel with the first electrical path. The second electrical path includes a voltage controlled shunt network having a gate connected to the output of the voltage bias element.

In another embodiment, the present disclosure relates to a method of forming an ESD protection device comprising low-voltage, thin-oxide devices, which is configured to operate at a high supply voltage. The method comprises providing an electrostatic discharge (ESD) susceptible circuit electrically connected to a first circuit node having a first voltage and a second circuit node having a second voltage. The method further comprises providing an RC trigger circuit having a resistive element and a thin-oxide MOS capacitor connected in series between the first circuit node and the second circuit node. The method further comprises connecting a source and drain of thin-oxide MOS capacitor to an intermediate supply voltage node having an intermediate supply voltage between the first and second voltage. The method further comprises connecting a body of the thin-oxide MOS capacitor to the second circuit node having the second voltage.

What is claimed is:

1. An integrated chip, comprising:
   an electrostatic discharge (ESD) susceptible circuit electrically connected to a first circuit node having a first voltage and a second circuit node having a second voltage; and
   an ESD protection device, configured to act as an interface between the ESD susceptible circuit and external integrated chip pins, comprising a first electrical path that is configured to divert an ESD event received at the first circuit node to the second circuit node and including an RC trigger circuit configured to selectively assert one or more trigger signals;
   wherein the RC trigger circuit comprises:
   a resistive element connected between the first circuit node and an intermediary node; and
   a MOS capacitor having a gate physically connected to the intermediary node, a source and drain connected to an intermediate supply voltage node having an intermediate supply voltage between the first and second voltages, and a body connected to the second circuit node.

2. The ESD protection device of claim 1, wherein the intermediate supply voltage node is electrically connected to and driven by: a voltage regulator, a voltage device disposed on the integrated chip, or an external pin of the integrated chip.

3. The integrated chip of claim 1, further comprising:
   a low-voltage transistor device having a gate connected to the intermediary node, a source connected to the intermediate supply voltage node, and a drain connected to a second RC trigger circuit output terminal.

4. The integrated chip of claim 3, wherein the ESD protection device further comprises:
   a voltage bias element having a first inverting element and a second inverting element arranged in series between the first and second circuit nodes;
   wherein the first inverting element is configured to receive a first trigger signal, that selectively activates the first inverting element, from a first RC trigger circuit output terminal; and
   wherein the second inverting element is configured to receive a second trigger signal, that selectively activates the second inverting element, from the second RC trigger circuit output terminal.

5. The integrated chip of claim 4, wherein the first inverting element comprises a high-voltage PMOS transistor device having a gate connected to the first RC trigger circuit output terminal, a source connected to the first circuit node, and a drain connected to a voltage bias element output node.

6. The integrated chip of claim 4, wherein the first inverting element comprises a low-voltage cascade, comprising:
   a first low-voltage PMOS transistor having a source connected to the first circuit node and a gate connected to the first RC trigger circuit output terminal; and
   a second low-voltage PMOS transistor having a gate connected to the intermediate supply voltage node, a source connected to the drain of the first low-voltage PMOS transistor, a body connected to the source of the second low-voltage PMOS transistor, and a drain connected to a voltage bias element output node.

7. The integrated chip of claim 4, wherein the ESD protection device further comprises an ESD voltage controlled shunt network, comprising a high-voltage shunt transistor having a gate connected to a voltage bias element output node.

8. An electrostatic discharge (ESD) protection device configured to protect a circuit from an ESD event, the ESD protection device comprising:
   a first electrical path having a first order RC trigger circuit connected between a first circuit node configured to receive an ESD event and a second circuit node, wherein the RC trigger circuit comprises:
   a resistive element connected to the first circuit node; and
   a thin-oxide MOS capacitor having a gate physically connected to the resistive element at a first trigger circuit output terminal, a source and a drain connected to an intermediate supply voltage node at a second trigger circuit output terminal, and a body connected to the second circuit node;
   a voltage bias element comprising an inverter having low-voltage transistors respectively comprising gates configured to receive a first trigger signal from the first trigger circuit output terminal and a second trigger signal from the second trigger circuit output terminal; and
   a second electrical path extending between the first and second circuit nodes and in parallel with the first electrical path, the second electrical path including a voltage controlled shunt network having a gate connected to the output of the voltage bias element.

9. The ESD protection device of claim 8, wherein the voltage controlled shunt network comprises a high-voltage shunt transistor having a gate connected to a voltage bias element output node.

10. The ESD protection device of claim 8, wherein the intermediate supply voltage has a value between a first voltage of the first circuit node and a second voltage of the second circuit node.

11. The ESD protection device of claim 10, wherein the first voltage is equal to 3.3 V, wherein the second voltage is equal to 0 V, and wherein the thin-oxide MOS capacitor comprises a thin-oxide that can withstand 1.8 V.

12. The ESD protection device of claim 8, wherein the first order RC trigger circuit is configured to selectively assert first and second trigger signals based on whether the first order RC trigger circuit detects the ESD event.

13. The ESD protection device of claim 12, wherein the inverter comprises:
    a first inverting element configured to receive the first trigger signal, that selectively activates the first inverting element, from a first RC trigger circuit output terminal; and
    a second inverting element configured to receive the second trigger signal, that selectively activates the second inverting element, from a second RC trigger circuit output terminal.

14. The ESD protection device of claim 13, wherein the first inverting element comprises a high-voltage PMOS transistor device having a gate connected to the first RC trigger circuit output terminal, a source connected to the first circuit node, and a drain connected to a voltage bias element output node.

15. The ESD protection device of claim 13, wherein the first order RC trigger circuit further comprises a third RC trigger circuit output terminal configured to assert a third trigger signal having a voltage value equal to the intermediate supply voltage.

16. The ESD protection device of claim 15, wherein the first inverting element comprises a low-voltage cascode, comprising:
    a first low-voltage PMOS transistor having a source connected to the first circuit node and a gate connected to the first RC trigger circuit output terminal; and
    a second low-voltage PMOS transistor having a gate connected to the third RC trigger circuit output terminal, a source connected to the drain of the first low-voltage PMOS transistor, a body connected to the source of the second low-voltage PMOS transistor, and a drain connected to a voltage bias element output node.

17. The ESD protection device of claim 13, further comprising:
    a low-voltage transistor device having a gate connected to an intermediary node between the resistive element and the thin-oxide MOS capacitor;
    wherein the gate is operated according to a first intermediate voltage at the intermediary node to provide the intermediate supply voltage to the second RC trigger circuit output terminal.

18. A method of forming an ESD protection device comprising low-voltage, thin-oxide devices, which is configured to operate at a high supply voltage, comprising:
    providing an electrostatic discharge (ESD) susceptible circuit electrically connected to a first circuit node having a first voltage and a second circuit node having a second voltage, wherein the first circuit node is configured to receive an ESD event; and
    providing an RC trigger circuit having a resistive element connected to the first circuit node and a thin-oxide MOS capacitor connected between the resistive element and the second circuit node;
    physically connecting a gate of the thin-oxide MOS capacitor to the resistive element;
    connecting a source and a drain of the thin-oxide MOS capacitor to an intermediate supply voltage node having an intermediate supply voltage between the first and second voltage; and
    connecting a body of the thin-oxide MOS capacitor to the second circuit node having the second voltage.

19. The method of claim 18, further comprising:
    connecting a gate of a low-voltage transistor device to an intermediary node between the resistive element and thin-oxide MOS capacitor; and
    connecting a source of the low-voltage transistor device to the intermediate supply voltage node.

20. The method of claim 18, wherein the RC trigger circuit comprises a first order RC trigger circuit having one resistor and one capacitor.

* * * * *